PRIORITY APPARATUS IN A COMPUTER SYSTEM
Filed May 26, 1966
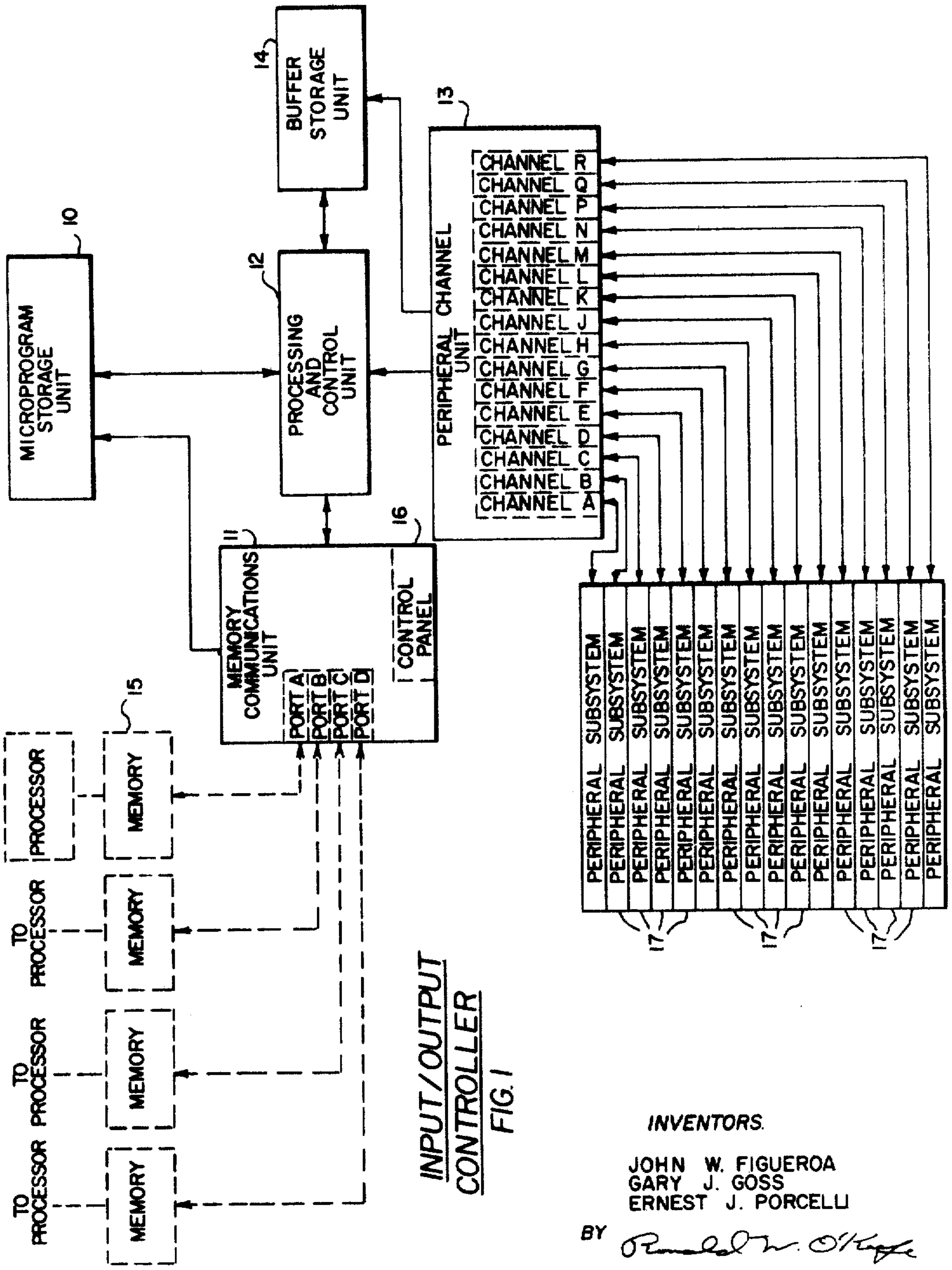
INPUT/OUTPUT CONTROLLER FIG. 1
INVENTORS.
JOHN W. FIGUEROA
GARY J. GOSS
ERNEST J. PORCELLI
BY Ronald W. O'Keefe
ATTORNEY United States Patent Office 3,483,522
Patented Dec. 9, 1969

3,483,522
PRIORITY APPARATUS IN A COMPUTER SYSTEM
John W. Figueroa, Gary J. Goss, and Ernest J. Porcelli, Phoenix, Ariz., assignors to General Electric Company, a corporation of New York
Filed May 26, 1966, Ser. No. 553,138
Int. Cl. G06f 9/18
U.S. Cl. 340—172.5 17 Claims

ABSTRACT OF THE DISCLOSURE

Apparatus is disclosed for determining priority among a number of intermittently furnished requests for diverse operations in a computer system. Each request is assigned a priority relative to other requests. Priority apparatus is provided for determining the highest priority request of a group of requests applied thereto. The groups of requests are sequentially transmitted to the priority apparatus; and, as each group of requests is applied to the priority apparatus, the priority apparatus responds by issuing a signal identifying the highest priority request of the group, which signal causes the corresponding operation to be performed in the computer system.

This invention relates to digital computer equipment and, in particular, to apparatus for allocating priority among a plurality of requests which may occur simultaneously in a component of the computer system.

A computer system normally comprises at least one data processor, at least one data storage unit or memory, and at least one input/output controller associated with a plurality of peripheral input and output devices or subsystems. Each data processor in the computer system processes data by executing a program. Each data storage unit of the computer system stores data to be processed, data which is the result of processing, and programs for controlling the processing operations of a data processor. The peripheral input devices supply to a data store unit, through the input/output controller, programs and data to be processed. The peripheral output devices receive processed data from a data storage unit, through the input/output controller, and utilize or store such processed data. In the described computer system, the input/output controller provides common control and a communications path for transfer of programs and data to be processed from the peripheral input devices to a data storage unit. The input/output controller also provides common control and a communications path for transfer of processed data from a data storage unit to the peripheral output devices.

A data processor of the computer system executes one or more programs. A program comprises a set of instructions, each instruction specifying a discrete type of processing operation in the computer system. A data processor executes a program by sequentially responding to each of the instructions of the program to perform the corresponding operations. The processing operations specified by the instructions of a program normally require interaction of a data storage unit with the data processor executing the program and often require a similar interaction with an input/output controller. The entire computer system is thus responsive to the program being executed by a data processor of the computer system.

An input/output controller of the computer system performs control and information transmission operations for its respective set of peripheral input and output devices. An input/output controller controls the storage of information items provided by each of its associated peripheral input devices or subsystems in a respective set of storage locations of a data storage unit. Thus, in transmitting the information items supplied in succession by a particular peripheral input device, an input/output controller supplies in sequence addresses of the storage locations of a data storage unit for receiving and storing the information items. Similarly, information items for transmission to each of its associated peripheral output devices are obtained by the input/output controller from a respective set of storage locations of a data storage unit. Thus, in transmitting information items in succession to a particular peripheral output device, an input/output controller also supplies in sequence addresses of the storage locations of a data storage unit for retrieving the information items.

In transmitting information items from a peripheral input device to a data storage unit or from a data storage unit to a peripheral output device, the input/output controller normally provides temporary storage of the information items. Because the necessity of transferring an information item from the input/output controller to a peripheral output subsystem or from a peripheral input subsystem to the input/output controller may arise concurrently for each of a plurality of peripheral subsystems to which the input/output controller is connected, an orderly arrangement for handling and for establishing priority among transfer requirements must be provided in the input/output controller. A large number of peripheral subsystems may be connected to an input/output controller and requirements for information item transfer involving all of the peripheral subsystems may occur simultaneously in the input/output controller. The apparatus provided to determine priority between simultaneous transfer requests must therefore be capable of handling the maximum possible number of concurrent requests. The above-described requirements arise in any information handling equipment wherein one element of the equipment must be shared by a plurality of other elements which have different assigned priorities for access to the one element. Complex and expensive apparatus is often required to handle a large number of requests in an orderly manner, accordingly, it is desirable to arrange the apparatus which determines priority among a plurality of requests so as to efficiently utilize such apparatus and to minimize its complexity in cost.

It is therefore an object of this invention to provide improved priority selection apparatus in a computer system.

It is another object of this invention to provide improved priority selection apparatus which substantially reduces the amount of logic circuitry required to determine priority among a plurality of requirements.

It is another object of this invention to provide simplified apparatus in processing equipment which facilitates identification of the highest priority request of a plurality of requests present in the processing equipment.

It is a further object of this invention to provide, in an input/output controller which transfers information items to or from peripheral subsystems in response to corresponding requests, improved apparatus for determining priority among the requests for information item transfer.

It is a further object of this invention to provide, in an input/output controller which effects transfer of information items with a plurality of peripheral subsystems in response to service requests, improved apparatus for determining priority among the requests and for identifying the peripheral subsystem corresponding to the request which is granted priority.

The foregoing objects are achieved, in accordance with the illustrated embodiment of the invention, by providing a plurality of sets of logic gates, each set of logic gates receiving the information item transfer requests, termed peripheral channel service requests, corresponding to a predetermined group of peripheral subsystems.

Timing apparatus is provided to periodically generate a series of timing pulses, each timing pulse being applied to one set of logic gates and defining a different time period. During a given time period, the peripheral channel service requests applied to the set of gates receiving the timing pulse defining that time period are transmitted by the set of gates to storage flip-flops. The outputs of the storage flip-flops are applied to priority logic which provides one output signal representing the highest priority service request present in the storage flip-flops. The output signal of the priority logic is stored in one of a plurality of decision flip-flops. The output signal of the appropriate decision flip-flop, in conjunction with a timing pulse from the timing apparatus, causes the transfer of an information item between the input/output controller and the peripheral subsystem corresponding to the highest priority service request applied to the set of gates during the given time period. During each of the other time periods defined by the timing pulses generated by the timing apparatus, the peripheral channel service requests corresponding to another of the groups of peripheral subsystems are sampled. Because the sampling of each group of service requests occurs during a different time period, the same storage flip-flops, priority logic and decision flip-flops are employed to determine the highest priority service request present in each group.

When an input/output controller encounters during operation certain conditions or contingencies relating to the peripheral subsystems, a transfer of information between the input/output controller and a data storage unit may be required. For example, it may be necessary to transfer information received by the input/output controller from a peripheral subsystem to a data storage unit or to transfer information from a data storage unit to the input/output controller for subsequent transmission to a peripheral subsystem. This requirement may arise simultaneously for more than one peripheral subsystem. Similarly, when a peripheral input or output subsystem encounters during operation certain conditions or contingencies, execution of a program or a program part by a data processor may be required before the peripheral input or output subsystem can continue operation or before a new operation can be initiated in the peripheral input or output subsystem. In the latter case, information relating to the type of condition or contingency encountered by the peripheral input or output device and a request for execution of the program or program part appropriate to the type of condition or contingency must be communicated by the input/output controller to a data storage unit. For each of the above-described information transfers between the input/output controller and a data storage unit, a particular sequence of operations or routine must occur in the input/output controller to accomplish the communication of information and requests between the input/output controller and a data storage unit.

Because the input/output controller handles a variety of information and request transfers for each peripheral input and output subsystem, and because more than one type of information or request transfer requirement for each peripheral subsystem may arise concurrently and several of the same type of information or request transfers may be required by different peripherals, an orderly arrangement for handling and determining priority among such transfers in the input/output controller is required. Handling and determining priority among a large number of requests of different types in an orderly manner, often requires complex and expensive apparatus. Accordingly, it is desirable to provide an arrangement for efficiently handling and determining priority among requests of different types in computer apparatus.

It is another object of this invention to provide improved priority selection apparatus which substantially reduces the amount of logic circuitry required to determine priority among a plurality of requirements of different types.

It is another object of this invention to provide simplified apparatus in a computer system which efficiently handles various classes of requests and determines priority among the requests of each class.

It is another object of this invention to provide improved program interrupt request priority apparatus in a computer system.

It is a further object of this invention to provide, in an input/output controller which performs a plurality of different operation routines in response to corresponding requests, improved apparatus for determining priority among the requests for each different operation routine.

The foregoing objects are achieved, in accordance with the illustrated embodiment of the invention, by providing one set of priority logic which is shared, on a time division basis, between groups of routine requests. The input/output controller of the computer system, in performing its function of furnishing control and a communications path for transfer of information between a data storage unit and the peripheral input and output devices, performs a number of different routines, each in response to a corresponding request. These routines are identified as the data service routine, the special interrupt routine and the terminate interrupt routine.

A data service routine is performed by the input/output controller when transfer of data between a data storage unit and a buffer storage unit of the input/output controller is necessary to properly service the data requirements of a particular peripheral input or output subsystem. A data service routine request may occur in the input/output controller for each of the peripheral subsystems. A special interrupt routine is performed by the input/output controller to transmit a special interrupt request and information concerning the requesting peripheral subsystem to a data storage unit. A request for a special interrupt routine may be furnished by each peripheral subsystem in response to unique conditions occurring in that subsystem. A terminate interrupt routine is performed by the input/output controller to transmit a terminate interrupt request and information concerning a requesting peripheral subsystem to a data storage unit. A terminate interrupt request may be furnished by each peripheral subsystem in response to a condition requiring termination of an operation in that subsystem.

Because a large number of peripheral input and output subsystems are normally connected to the input/output controller, a large number of requests for the different routines may be present in the input/output controller at a given time. In accordance with the invention, the set of priority logic provided in the input/output controller is capable of handling a plurality of simultaneous requests for a particular type of routine. Timing apparatus is provided to periodically generate successive timing signals, each timing signal defining a time period. The timing signals and the requests for each type of routine are applied to a series of logical gates.

During one time period, as defined by the timing signals, the logical gates sample the special interrupt routine requests which may be present. The detected special interrupt routine requests are applied by the logical gates to the set of priority logic which determines the highest priority special interrupt routine request present. This request, and the identification of the peripheral subsystem furnishing the request are stored and, at an appropriate time, the input/output controller performs the special interrupt routine to transfer a special interrupt request and information concerning the peripheral subsystem furnishing the highest priority special interrupt routine request to a data storage unit.

During the next time period, as defined by the timing signals, the logical gates sample the data service routine requests which may be present. The logical gates apply the detected data service routine requests to the set of priority logic which determines the highest priority data service routine request present and stores this request and the identification of the corresponding peripheral subsystem. Subsequently, the input/output controller performs the data service routine to transfer data between a data storage unit and the input/output controller, as required to service the peripheral subsystem corresponding to the highest priority data service routine request.

During a subsequent time period, the logical gates sample the terminate interrupt routine requests and apply the detected terminate interrupt routine requests to the set of priority logic. The highest priority terminate interrupt routine request, as determined by the priority logic, and an identification of the corresponding peripheral subsystem is stored. The input/output controller subsequently performs a terminate interrupt routine to transfer a terminate interrupt request and information concerning the peripheral subsystem furnishing the highest priority terminate interrupt routine request to a data storage unit. The sampling of data service routine requests is alternated with sampling of special interrupt routine and terminate interrupt routine requests because of the necessity that data service routine requests be granted promptly to prevent timing errors and loss of data.

Certain portions of the apparatus herein disclosed are not of our invention, but are the inventions of:

John W. Figueroa, Ernest J. Porcelli, and Laszlo L. Rakoczi, as defined by the claims of their application, Ser. No. 553,340, filed May 27, 1966;

John W. Figueroa, Gary J. Goss, and Ernest J. Porcelli, as defined by the claims of their application, Ser. No. 553,341, filed May 27, 1966;

Ernest J. Porcelli and Laszlo L. Rakoczi, as defined by the claims of their application, Ser. No. 553,342, filed May 27, 1966;

John W. Figueroa, Ernest J. Porcelli, and Laszlo L. Rakoczi, as defined by the claims of their application, Ser. No. 553,343, filed May 27, 1966; and Ernest J. Porcelli and Laszlo L. Rakoczi, as defined by the claims of their application, Ser. No. 553,436, filed May 27, 1966; all such applications being assigned to the assignee of the present application.

For a complete description of the input/output controller of FIGURE 1 and of the instant invention which is embodied in such input/output controller, reference is made to United States Patent No. 3,409,880, issued to Gerald Galler, Ernest J. Porcelli, and Laszlo L. Rakoczi, and assigned to the assignee of the present invention. More particularly, FIGURES 2–188 of the drawing; column 5, lines 69–75; columns 6–103; and column 104, lines 1–48 of United States Patent 3,409,880 are incorporated herein by reference and made a part of the instant patent application.

Description of drawings

The subject matter of the invention is particularly pointed out and distinctly claimed in the concluding portion of the specification. The invention, however, both as to organization and method of operation, may best be understood by reference to the following description taken in connection with the accompanying drawings, in which:

FIGURE 1 is a block diagram of the input-output controller of a data processing system to which the instant invention is applicable.

What is claimed is:

1. In a computer system for performing selected operations, the combination comprising: a predetermined number of request means for intermittently furnishing requests for operations in the computer system, each of said requests being assigned a predetermined priority relative to other requests, priority means for determining the highest priority request of the requests applied thereto, timing means for defining a series of successive time periods, gating means for receiving the requests furnished by said request means and responsive to said timing means for causing said priority means to sample during each time period the requests furnished by a number of said request means less than said predetermined number and for causing said priority means to sample the requests of all of said request means during the series of successive time periods, and means responsive to the determination of said priority means during each time period for causing the corresponding operation to be performed in the computer system.

2. In a computer system for performing a plurality of operations, the combination comprising: request apparatus for furnishing a plurality of groups of intermittent requests, each request of a group being assigned a priority relative to the other requests of a group, each of said requests seeking performance of a particular operation in the computer system, priority means for providing an output signal identifying the highest priority request of a group of requests applied to the priority means, gating means for sequentially transmitting the groups of requests to said priority means, means included in said gating means for transmitting the requests comprising each group simultaneously to said priority means, and means responsive to the output signal of said priority means during application of each group of requests to said priority means for causing the corresponding operation to be performed in the computer system.

3. In a computer system, the combination comprising: a data storage means, a plurality of data handling means, each of said data handling means issuing a request signal when a data transfer with said data storage means is required, timing means for generating a plurality of successive timing signals to define corresponding successive time periods, a plurality of storage flip-flops for storing request signals, a plurality of gating means, each of said gating means receiving the request signals of different ones of said data handling means, the request signals received by each of said gating means being assigned a predetermined priority with respect to each other, each of said gating means being responsive to one of the timing signals generated by said timing means to transmit the request signals applied to that gating means to respective ones of said plurality of storage flip-flops during the corresponding time period, priority means responsive to the request signals stored in said storage flip-flops for issuing a signal indicating the highest priority request signal stored in said storage flip-flops, a plurality of decision flip-flops, means responsive to said timing means and to the output signal of said priority means for causing a predetermined one of said decision flip-flops to enter a predetermined state, means responsive to said timing means and to the states of said decision flip-flops to cause data transfer between said data storage unit and the data handling means issuing the highest priority request signal of the request signals transmitted to said storage flip-flops during a predetermined time period, and means for clearing said storage and decision flip-flops during each time period preparatory to storage of priority information relating to the request signals received by a different gating means.

4. In a computer system, the combination comprising: information storage means, a plurality of data handling means, each of said data handling means generating a request signal when transfer of an information item between the corresponding data handling means and said information storage means is required, each of said request signals being assigned a priority relative to other request signals, priority means for providing an output signal indicating the highest priority request signal applied to said priority means during a given time period, a plurality of gating means, each of said gating means receiving the request signals of a different group of data handling means and applying the received request signals to said priority means during a different time period, and means responsive to the output signal of said priority means for causing transfer of an information item between said data storage means and the data handling means corresponding to the output signal of said priority means.

5. In a computer system, the combination comprising: information storage means, a plurality of data handling means for transmitting information items to said information storage means and for receiving information items from said information storage means, each of said data handling means including means for issuing a request signal when transfer of an information item between said information storage means and the corresponding data handling means is required, timing means for periodically generating a series of successive timing signals to define corresponding successive time periods, priority means for determining the highest priority request signal applied to said priority means during a predetermined time period and responsive to the timing signals of said timing means for providing an output signal identifying the data handling means furnishing the highest priority request signal, a plurality of gating means, each of said gating means receiving the request signal of a different group of data handling means and responsive to the timing signals generated by said timing means for applying the received request signals to said priority means during a different one of said time periods, and means responsive to the output signal of said priority means for causing an information item to be transferred between said information storage means and the data handling means identified by the output signal of said priority means.

6. In a computer system, the combination comprising: information storage means, a plurality of data handling means, for transmitting information items to and for receiving information items from an information storage means, each of said data handling means including means for issuing a request signal when transfer of an information item between said information storage means and the corresponding data handling means is required, each of said data handling means being assigned to one of a plurality of groups, the request signal of each data handling means within each group being assigned a predetermined priority relative to the request signals of the other data handling means of the group, priority means comprising a first set of flip-flops for storing the request signals of a group, priority logic means for receiving the request signals stored in said first set of flip-flops and for generating a decision signal identifying the highest priority request stored in said first set of flip-flops, and a second set of flip-flops for storing the decision signal generated by said priority logic means, timing means for periodically generating a series of successive timing signals to define corresponding successive time periods, a plurality of gating means, each of said gating means receiving the request signals of one said group, each of said gating means being responsive to a predetermined one of the timing signals generated by said timing means for transferring the request signals of the corresponding group of data handling means to said first set of flip-flops of said priority means during the corresponding time period, and means responsive to the information subsequently stored in the second set of flip-flops of said priority means and to said timing signals generated by said timing means for causing transfer of an information item between said information storage means and the the appropriate data handling means.

7. In a computer system including apparatus for furnishing a plurality of groups of randomly occurring requests, the requests of each group being of a predetermined type different from the requests of the other groups, each request of a group being assigned a priority relative to the other requests of the group, the combination comprising: priority means for identifying the highest priority request present in a group of requests applied to said priority means, gating mean for receiving the requests of each of said plurality of groups and responsive to control signals for transmitting the current requests in a selected one of said groups to said priority means, and control means for supplying control signals to said gating means for causing said gating means to transmit at different times the requests of each group to said priority means.

8. In a computer system including apparatus for furnishing a plurality of groups of randomly occurring requests, the requests of each group being of a predetermined type different from the requests of the other groups, each request of a group being assigned a priority relative to the other requests of the group, the combination comprising: priority means for identifying the highest priority request present in a group of requests applied to said priority means, gating means for receiving the requests of each of said plurality of groups and responsive to each of a plurality of control signals for transmitting the requests of a selected one of said groups to said priority means, and control means for supplying control signals in sequence to said gating means to cause said gating means to transmit in succession the requests of each group to said priority means.

9. In a computer system including apparatus for furnishing a plurality of groups of randomly occurring requests, the requests of each group being of a predetermined type different from the requests of the other groups, each request of a group being assigned a priority relative to the other requests of the group, the combination comprising: priority means for identifying the highest priority request present in a group of requests applied to said priority means, timing means for defining successive time periods, and gating means for simultaneously receiving the requests of each of said plurality of groups and responsive to the time periods defined by said timing means for transmitting the current requests of a selected one of said groups to said priority means during each time period.

10. In a computer system which performs a plurality of different routines, each in response to one of a plurality of different requests, the combination comprising: a plurality of request means, each of said request means being capable of selectively generating, in response to predetermined conditions, requests for each of the different routines performed by the computer system, the requests generated by each of said request means being assigned a priority relative to the requests generated by the other request means, priority means for identifying the highest priority request in a plurality of requests for one of said routines applied to said priority means, timing means for periodically generating a series of timing signals, each of said timing signals defining a different time period, gating means for simultaneously receiving the requests from each of said request means and responsive to the timing signals generated by said timing means for transmitting the current requests for one of said routines to said priority means during each time period defined by said timing signals.

11. In a computer system including a processor for performing data processing operations under control of a main program, said main program being interruptable to perform different types of data processing operations in response to corresponding types of interrupt requests, the combination comprising: a plurality of request means for generating interrupt requests, each of said request means being capable of selectively generating, in response to predetermined conditions, at least two types of interrupt requests, the requests generated by each of said request means being assigned a priority relative to the requests generated by the other request means, priority means for identifying the highest priority request of a plurality of interrupt requests of one of said types applied to said priority means, control means for periodically generating a series of timing signals each of said timing signals defining a different time period, and gating means for receiving the interrupt requests from each of said request means and responsive to the timing signals generated by said control means for transmitting the current requests of one of said types of interrupt requests to said priority means during each time period, and means for transmitting to said processor the identification of the highest priority request furnished by said priority means during each time period.

12. In a computer system including a controller for performing first, second and third routines the combination comprising: a plurality of first means each of said first means intermittently generating requests for said first routine each of said requests having an assigned priority with respect to other requests for said first routine generated by said first means, a plurality of second means, each of said second means intermittently generating requests for said second routine, each of said requests having an assigned priority with respect to other requests for said second routine generated by said second means, a plurality of third means, each of said third means intermittently generating requests for said third routine, each of said requests having an assigned priority with respect to other requests for said third routine generated by said third means, priority means for determining the highest priority request among a plurality of requests for one of said routines applied to said priority means, control means for generating a periodic series of three timing control signals, each of said timing signals defining a different time period, and gating means for receiving the requests generated by said first, second and third means and responsive to the timing signals generated by said control means for gating the current requests for said first routine from said plurality of first means to said priority means during the first of said time periods, for gating the current requests for said second routine from said second request means to said priority means during the second of said time periods and for gating the current requests for said third routine from said third request means to said priority means during the third of said time periods.

13. In a computer system including a controller for performing first and second routines, the combination comprising: a plurality of request means, each of said request means intermittently generating a request for said first routine and a request for said second routine, priority means for furnishing an output indicating the highest priority request among a plurality of requests for one of said routines applied to said priority means, control means for generating a periodic series of timing signals, each of said timing signals defining a different time period, and a plurality of gating means, each of said gating means receiving the requests generated by one of said request means, each of said gating means including means responsive to the timing signals generated by said control means for gating a request for said first routine to said priority means during one of said time periods and for gating a request for said second routine to said priority means during a second of said time periods, and means responsive to the output of said priority means during each time period for causing said controller to perform the corresponding routine.

14. In a computer system, the combination comprising: a plurality of data handling means, each of said data handling means performing operations and furnishing a plurality of different kinds of request signals in response to corresponding different conditions in said data handling means, each request of a given kind issued by one of said data handling means being assigned a predetermined priority relative to the other requests of the same kind issued by the other data handling means, operating means for performing different types of operations to resolve the conditions in said data handling means giving rise to the corresponding kinds of request signals, priority means for providing an output identifying the data handling means furnishing the highest priority request of a given kind applied to said priority means, timing means for periodically issuing a series of timing signals to define corresponding time periods, gating means for receiving the request signals issued by each of said data handling means and for receiving the timing signals generated by said timing means, said gating means being responsive to the timing signals for transmitting all requests of a selected kind to said priority means during each time period, and means responsive to the output of said priority means during each time period for causing said operating means to perform an operation for resolving the predetermined condition in the identified data handling means.

15. In a computer system, the combination comprising: request apparatus for furnishing a plurality of groups of randomly occurring requests, the requests of each group being of a predetermined type different from the requests of other groups, each request of a group being assigned a priority relative to the other requests of the group, priority means for providing an output identifying the highest priority request present in a group of requests applied to said priority means, first storage means responsive to the output of said priority means indicating that at least one request of a group has been applied to said priority means for storing an indicium corresponding to that group, timing means for periodically generating a series of timing pulses, each of said timing pulses defining a different time period, gating means for simultaneously receiving the requests furnished by said request apparatus and responsive to the timing signals generated by said timing means for transmitting the current requests of one of said groups to said priority means during each time period, and second storage means responsive to the output of said priority means for storing an identification of the apparatus furnishing the corresponding request.

16. In a computer system, the combination comprising: a plurality of request means, each of said request means adapted to selectively generate a plurality of different types of requests, the different types of requests being common to each of said request means, a request of one of said types generated by one of said request means being assigned a priority relative to the requests of the same type generated by the other request means, priority means for providing an output identifying the highest priority request of one of said types applied to said priority means, first storage means responsive to the output of said priority means during each time period for storing an indicium corresponding to each type of request when at least one request of that type has been applied to said priority means, second storage means responsive to the output of said priority means during each time period for storing an identification of the request means generating the highest priority request of the type applied to said priority means during that time period, and control means for periodically generating a series of signals, each of said signals defining a different time period, gating means for receiving the requests generated by each of said request means and responsive to the signals generated by said control means for applying the current requests of each of said types to said priority means during a predetermined time period, means for altering the identification in said second storage means upon application of a request of a corresponding type to said priority means having a higher priority than the request of the request means identified in said second storage means.

17. In a computer system, the combination comprising: a controller for performing first and second routines, data storage means for storing information items, a plurality of data handling means, each of said data handling means being assigned to one of a plurality of groups each of said data handling means issuing a transfer request signal when a data transfer with said data storage means is required, the transfer request signal of each of said data handling means being assigned a priority relative to the transfer request signals of the other data handling means of the group, each of said data handling means issuing a first routine request signal in response to a condition occurring in the data handling means, the first routine request signal of each of said data handling means being assigned a priority relative to the first routine request signals of the other data handling means, signalling means associated with each of said data handling means, each of said signalling means being responsive to the transfer of a predetermined number of data items between said data storage means and the corresponding data handling means for issuing a second routine request signal, the second routine request signal of each of said signalling means being assigned a priority relative to the second routine request signals of the other signalling means, first priority means for providing an output identifying the highest priority routine request of a plurality of routine requests applied to said first priority means, second priority means for providing an output signal identifying the highest priority transfer request of a plurality of transfer requests applied to said second priority means, timing means for periodically generating a series of timing signals to define successive time periods, first gating means for receiving the first and second routine request signals and responsive to said timing mean for transmitting the first routine request signals to said first priority means during one of said time periods and for transferring the second routine request signals to said first priority means during another of said time period, means responsive to the output of said first priority means for identifying the data handling means corresponding to the highest priority routine request present during each time period and for causing said controller to perform the corresponding routine, second gating means for receiving the transfer request signals and responsive to the timing means for applying the transfer request signals of one of said groups to said second priority means during each time period, and means responsive to the output of said second priority means for identifying the data handling means furnishing the highest priority data transfer request during each time period and for causing transfer of a data item between the identified data handling means and said data storage means.

References Cited

UNITED STATES PATENTS

| | | | |
|---|---|---|---|
| 3,344,410 | 9/1967 | Collins et al. ------ | 340—172.5 |
| 3,353,160 | 11/1967 | Lindquist ---------- | 340—172.5 |
| 3,353,162 | 11/1967 | Richard et al. ------ | 340—172.5 |

PAUL J. HENON, Primary Examiner

R. B. ZACHE, Assistant Examiner